(12) United States Patent
Bell et al.

(10) Patent No.: US 10,379,922 B1
(45) Date of Patent: Aug. 13, 2019

(54) ERROR RECOVERY IN A VIRTUAL MACHINE-BASED DEVELOPMENT ENVIRONMENT

(71) Applicant: INTUIT INC., Mountain View, CA (US)

(72) Inventors: Chad Bell, San Diego, CA (US); Vinay Kumar, San Diego, CA (US); Ryan Lynch, San Diego, CA (US); Joseph Elwell, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 100 days.

(21) Appl. No.: 15/468,985

(22) Filed: Mar. 24, 2017

(51) Int. Cl.
  *G06F 11/00* (2006.01)
  *G06F 11/07* (2006.01)
  *G06F 9/455* (2018.01)

(52) U.S. Cl.
  CPC ...... *G06F 11/0712* (2013.01); *G06F 9/45558* (2013.01); *G06F 11/0751* (2013.01); *G06F 11/0769* (2013.01); *G06F 11/0793* (2013.01); G06F 2009/45591 (2013.01)

(58) Field of Classification Search
  CPC .............. G06F 11/0712; G06F 11/0751; G06F 11/0769; G06F 11/0793; G06F 11/1402; G06F 11/1417; G06F 11/1438; G06F 11/1441; G06F 11/1458; G06F 11/1469; G06F 11/301; G06F 9/45558; G06F 2009/45591
  See application file for complete search history.

(56) References Cited

U.S. PATENT DOCUMENTS

| 2012/0066546 | A1* | 3/2012 | Kim | G06F 11/1417 714/15 |
| 2014/0101489 | A1* | 4/2014 | Yang | G06F 9/45558 714/38.13 |
| 2014/0372788 | A1* | 12/2014 | Vavrick | G06F 11/0793 714/4.1 |
| 2017/0116084 | A1* | 4/2017 | Liu | G06F 11/1438 |
| 2018/0211042 | A1* | 7/2018 | Reinecke | G06F 9/45558 |
| 2018/0253362 | A1* | 9/2018 | Reinecke | G06F 11/0793 |

* cited by examiner

*Primary Examiner* — Joseph D Manoskey
(74) *Attorney, Agent, or Firm* — Patterson + Sheridan, LLP (57) ABSTRACT

The present disclosure relates to error recovery in a virtual machine-based development environment. An example method generally includes monitoring for an error event in a virtual machine managed within a development environment. The development environment attempts to recover the virtual machine from the error event by performing a first error remediation procedure on the virtual machine. Upon determining that the first error remediation procedure failed to recover the virtual machine from the error event, the development environment attempts to recover the virtual machine from the error event by performing a second error remediation procedure on the virtual machine. The second remediation procedure may be a procedure that is more severe than the first error remediation procedure.

20 Claims, 6 Drawing Sheets

ERROR RECOVERY IN A VIRTUAL MACHINE-BASED DEVELOPMENT ENVIRONMENT

BACKGROUND

Field

Embodiments presented herein generally relate to managing software development environments, and more specifically to recovering from system errors in a virtual machine-based development environment.

Description of the Related Art

Development environments generally include various components that are installed on a developer's local computer to allow a developer to create and modify program components (e.g., source code, graphical user interface (GUI) design, operational parameters, among others) and test modifications to the program components. These components can include shared libraries used by multiple programs in a development environment, integrated development environment tools (including, for example, compilers, interpreters, debuggers, code editing components, and user interface design tools), source code for projects under development, test versions of services on which projects under development depend, and so on. In some cases, development environments may connect to various source code repositories to obtain the source code for a project under development. Modifications to the source code may be performed on a developer's local computer and, after testing, be committed back to the source code repository as a new version of the source code.

Setting up a development environment on a local computer may be a time consuming task. In some cases, setting up a development environment on a local computer may result in conflicts between different versions of shared libraries used by different components in the development environment. These dependency conflicts may, in some cases, break the functionality of one or more software components on a local computer. In such a case, a developer may need to troubleshoot various programs on the local computer to identify and fix problems that arise when the developer sets up a development environment on the local computer. In some cases, dependency conflicts and other issues arising from setting up a development environment on a local computer may be severe enough that fixing the dependency conflicts or other issues may entail restoring the local computer to a previous operating state (e.g., from a backup of the local computer performed before the developer attempted to set up a development environment).

Additionally, when developers independently set up development environments on their own local computers, different developers may use different, and potentially incompatible, versions of development tools and development projects. Because the development environments deployed on different local computers used by different developers may be different and potentially incompatible, solutions developed to address problems on a single developer's local computer may not be applicable to other developer computers.

SUMMARY

One embodiment of the present disclosure includes a method for error recovery in a virtual machine-based development environment. The method generally includes monitoring for an error event in a virtual machine managed within a development environment. The development environment attempts to recover the virtual machine from the error event by performing a first error remediation procedure on the virtual machine. Upon determining that the first error remediation procedure failed to recover the virtual machine from the error event, the development environment attempts to recover the virtual machine from the error event by performing a second error remediation procedure on the virtual machine. The second remediation procedure may be a procedure that is more severe than the first error remediation procedure.

Another embodiment provides a computer-readable storage medium having instructions, which, when executed on a processor, performs an operation for error recovery in a virtual machine-based development environment. The operation generally includes monitoring for an error event in a virtual machine managed within a development environment. The development environment attempts to recover the virtual machine from the error event by performing a first error remediation procedure on the virtual machine. Upon determining that the first error remediation procedure failed to recover the virtual machine from the error event, the development environment attempts to recover the virtual machine from the error event by performing a second error remediation procedure on the virtual machine. The second remediation procedure may be a procedure that is more severe than the first error remediation procedure.

Still another embodiment of the present invention includes a processor and a memory storing a program, which, when executed on the processor, performs an operation for error recovery in a virtual machine-based development environment. The operation generally includes monitoring for an error event in a virtual machine managed within a development environment. The development environment attempts to recover the virtual machine from the error event by performing a first error remediation procedure on the virtual machine. Upon determining that the first error remediation procedure failed to recover the virtual machine from the error event, the development environment attempts to recover the virtual machine from the error event by performing a second error remediation procedure on the virtual machine. The second remediation procedure may be a procedure that is more severe than the first error remediation procedure.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Virtualization generally allows for the use of virtual machines to execute software in an environment segregated from the operating system and hardware executed by a host machine. In a virtualized computing system, a host machine provides execution environments in which one or more virtual machines, or guest systems, execute. The execution environments generally are software constructs that expose hardware functionality to an operating system executing on a virtual machine through emulation of a basic computing system or, in some cases, direct access to various hardware components of the host machine. Each virtual machine executing on a host machine generally stores data on a virtualized hard drive, which may be an emulated storage device that appears to be a hard drive or other storage device to a virtual machine but may be stored as one or more files on the storage devices connected to the host machine (e.g., a local hard drive, removable storage, or network attached storage).

Because virtual machines generally isolate the operations of a guest operating system and the applications deployed thereon from affecting the configuration of a host machine, deploying a development environment using virtual machines may prevent shared libraries deployed on a virtual machine from conflicting with dependencies that exist on a host machine. Additionally, because of the isolation properties of virtual machines, problems that arise within the virtual machine may affect the virtual machine itself (e.g., cause stop errors or other errors that may be fixed by rebooting the virtual machine) but may not adversely affect the functionality of the host machine. Further, host machines may not be adversely affected by corruption or modifications that cause instability in a virtual machine. To remedy such problems, the host machine need not be modified. To fix corruption or stability problems in a virtual machine, the virtual machine can be replaced by overwriting a virtual hard drive file associated with the virtual machine with a new virtual hard drive file.

The properties of virtual machines and virtualization provide a platform for centrally managing development environments using virtual machines. Pre-configured virtual machines may be established for components of a development environment that developers can use to modify and test software under development. For example, some virtual machines may be configured to run test versions of services under development, while other virtual machines may be configured to run stable versions of service dependencies, or services that are used by the software under development. Because these virtual machines may be pre-configured, a user need not perform additional configuration in order to use the development environments provided by these virtual machines. Using these virtual machines, technical and non-technical developers can quickly provision development environment from a plurality of pre-configured virtual machines, and the resulting development environment may be isolated from the developers' local computers and easily maintainable (e.g., through replacement of outdated or malfunctioning virtual machine images with more recent virtual machines or versions of virtual machines that are known to work).

Embodiments of the present disclosure provide techniques for managing service dependencies in a virtual machine-based development environment. Management of service dependencies may entail, as described in further detail herein, examining a development environment to identify whether services upon which different virtual machines in a virtual environment depend are active.

Further, embodiments of the present disclosure provide techniques for automatically recovering from system errors in a virtual machine-based development environment. As discussed herein, errors may be remediated by performing progressively more intensive remediation procedures on a virtual machine. These procedures may generally be transparent to a user until the error is remediated or no more remediation steps exist (e.g., as defined in a script identifying an order in which remediation procedures may be performed).

Figure 1:
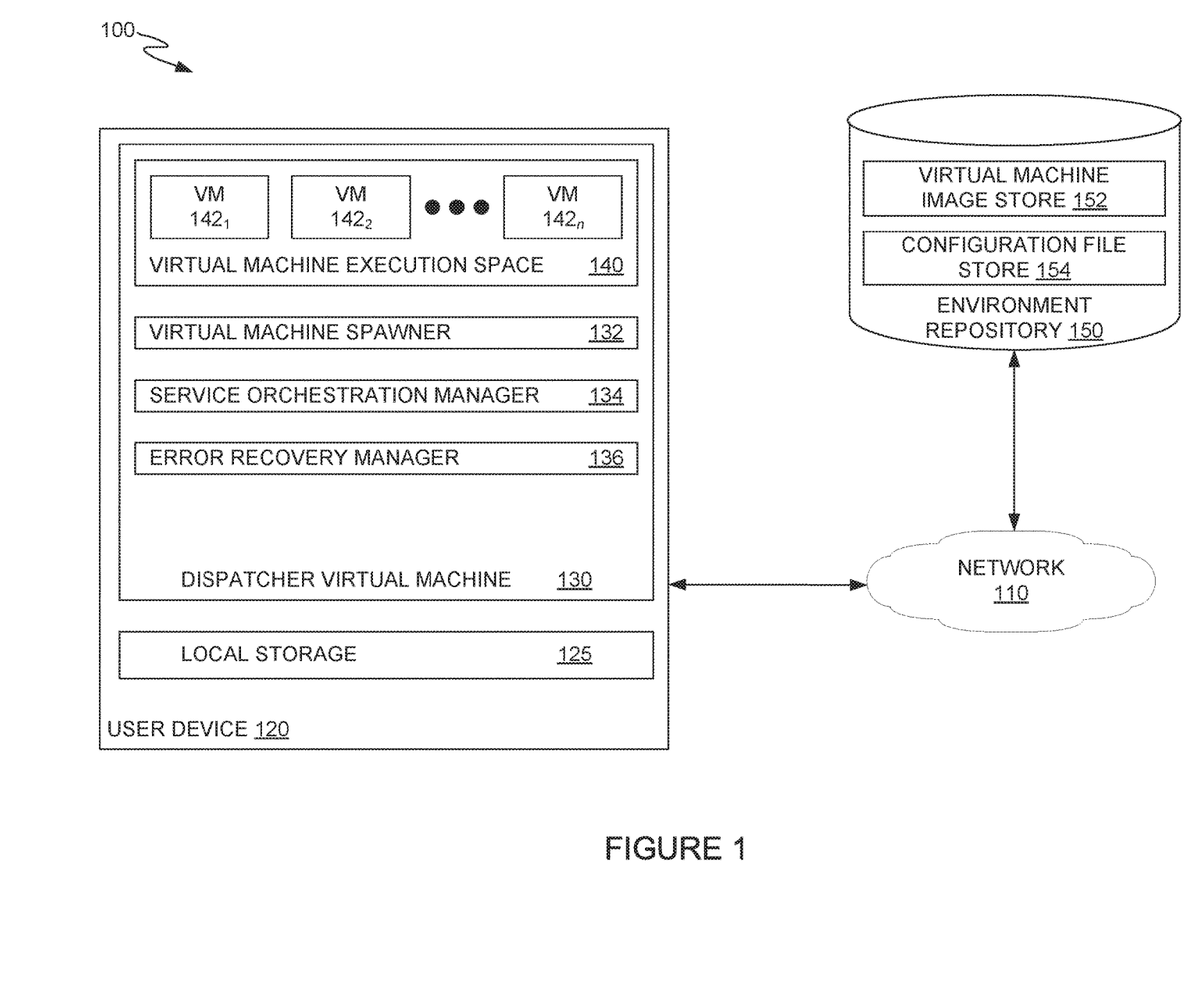
FIG. 1 illustrates an example computing environment, according to one embodiment.

FIG. 1 illustrates an example computing environment for [managing service dependencies in a virtual machine-based development environment]. As illustrated, computing environment 100 includes a user device 120 and an environment repository 150, connected via network 100.

As illustrated, user device 120 includes local storage 125 and a dispatcher virtual machine 130. Local storage 125 may be a hard drive, solid state drive, or other electronic storage on which dispatcher virtual machine 130 and components thereof can store and modify virtual machine images used to provision a development system for a user of user device 120. Local storage 125 may additionally provide a user-accessible storage repository for development project files (e.g., program source code, user interface files, configuration files, and other code components of a development project). As discussed in further detail herein, one or more virtual machines 140 executing within dispatcher virtual machine 130 can access development project files to save changes to program source code on user device 120, test software using program source code saved in local storage 125, and commit tested changes to a source code repository associated with a development project.

Dispatcher virtual machine 130 may be a virtual machine configured to manage the deployment of various components of a development platform on user device 120, according to an embodiment. In managing the deployment of a development platform, dispatcher virtual machine 130 may isolate operation of the various components of a development project from each other and from affecting the configuration of user device 120, as components of the development project may be executed in independent virtual machines within a virtual machine execution space provided by dispatcher virtual machine 130. As illustrated, dispatcher virtual machine includes a virtual machine spawner 132, service orchestration manager 134, error recovery manager 136, and virtual machine execution space 140.

Virtual machine spawner 132 generally obtains virtual machine images from a central repository (e.g., environment repository 150) and spawns virtual machines based on the obtained virtual machine images. In some cases, virtual machine spawner 132 can generate a user interface for display on user device 120 that illustrates the development virtual machines that dispatcher virtual machine 130 can obtain from a central repository and execute in virtual machine execution space 140.

To spawn a virtual machine, virtual machine spawner 132 can use information specifying the virtual machine to be instantiated to obtain a virtual machine image and configuration data from virtual machine image store 152 and configuration file store 154, respectively, in environment repository 150. The virtual machine images and configuration files downloaded from environment repository 150 may be stored in one or more directories in local storage 125. These directories may be located in local storage 125 and need not be located in a virtual disk from which dispatcher virtual machine 130 executes.

In some cases, the information specifying the virtual machine may be received from dispatcher virtual machine 130 based on user selection of one or more services to be instantiated in a user interface provided to a user by dispatcher virtual machine 130. The information specifying the virtual machine to be instantiated may be received from service orchestration manager 134, in situations where service orchestration manager 134 is attempting to instantiate virtual machines associated with services that another virtual machine depends from. In these cases, virtual machine spawner 132 can download virtual machine images and configuration files for the specified virtual machine from environment repository 150 and use the downloaded files to instantiate a virtual machine 142 in virtual machine execution space 140. In some cases, virtual machine spawner 132 can receive, from error recovery manager 136, information identifying a location in local storage 125 of a downloaded virtual machine image and configuration data.

After downloading the virtual machine image and configuration file for a virtual machine from environment repository 150, virtual machine spawner 132 instantiates a virtual machine 142 in virtual machine execution space 140 based on the downloaded virtual machine image and configuration file. The configuration file generally specifies a configuration for the virtual machine 142, which may include, for example, a number of virtual processors to allocate to virtual machine 142, an amount of random access memory (RAM) to allocate to virtual machine 142, a location of a virtual machine image from which virtual machine 142 executes, one or more files serving as a virtualized local storage for virtual machine 142, and the like. Based on the configuration file, virtual machine spawner 132 can instantiate a virtual machine container in which virtual machine 142 executes.

Service orchestration manager 134 generally monitors user selections of the virtual machines to be spawned in virtual machine execution space 140 to determine if service dependencies have been satisfied, according to an embodiment. In some cases, service orchestration manager 134 may identify whether service dependencies have been satisfied while virtual machine spawner 132 instantiates a virtual machine for a first service. In some cases, service orchestration manager 134 may identify whether service dependencies for the first service have been satisfied after a virtual machine 142 has been instantiated for the first service and before virtual machine spawner 132 indicates to a user that the service executing on virtual machine 142 is ready for use.

To identify the service dependencies of a first service, service orchestration manager 134 can examine one or more configuration files associated with the first service that identify the services that are to be instantiated and ready for use before the first service can be successfully executed. The one or more configuration files may be formatted, for example, as a Javascript object notation (JSON) file, an extensible markup language (XML) file, or a file in any other parseable format (e.g., CSV, tab-delimited text, and the like). In some cases, the one or more configuration files may identify some services as internal dependencies, or services that can be executed on one or more virtual machines 142 in virtual machine execution space 140, or external dependencies, or services that are available from remote sources (e.g., cloud storage services).

Service orchestration manager 134 can examine each identified service from which the first service depends to determine whether the service is available in virtual machine execution space 140 and/or from an external service provider. To determine whether an internal service is available in virtual machine execution space 140, service orchestration manager can maintain a list of virtual machines 142 executing in virtual machine execution space 140 and information about what services are executing in each virtual machine 142. If service orchestration manager 134 finds an entry in the list indicating that the service is available from a virtual machine 142 in virtual machine execution space 140, service orchestration manager 134 can establish a connection between the virtual machine hosting the service dependency and the virtual machine hosting the first service. In some cases, service orchestration manager 134 can determine whether a service is active on one or more virtual machines 142 in virtual machine execution space 140 by requesting service deployment information from each of the one or more virtual machines 142. The requests may be transmitted from service orchestration manager 134 to each of the one or more virtual machines 142 via a virtualized network connection between dispatcher virtual machine 130 and the one or more virtual machines 142 executing within virtual machine execution space 140. In response to a service deployment information request, service orchestration manager 134 can receive information identifying the one or more services executing on each virtual machine 142 and can examine the received information to determine if the service is executing on the virtual machine 142.

If service orchestration manager 134 determines that an internal service is not available on any of the virtual machines 142, service orchestration manager 134 can search virtual machine image store 152 for a virtual machine that is configured to host the specified internal service. In some cases, service orchestration manager 134 can search for the specified internal service based on the name of the internal service and information about a version of the first service being instantiated in virtual machine execution space 140. Service orchestration manager 134 can download the virtual machine image and configuration file for the specified internal service into a directory in local storage 125 from virtual machine image store 152 and configuration file store 154, respectively. After the virtual machine image and configuration file are downloaded, service orchestration manager 134 can invoke virtual machine spawner 132 to spawn a virtual machine 142 in virtual machine execution space 140. In some cases, service orchestration manager 134 may request that virtual machine spawner 132 inform service orchestration manager when the virtual machine hosting the specified internal service has been instantiated and is available for use. Upon receiving the indication that the specified internal service is available for use, service orchestration manager 134 can establish a connection between the virtual machine 142 hosting the first service and the virtual machine 142 hosting the specified internal service.

In some cases, service orchestration manager 134 may determine whether external service dependencies, such as cloud-based storage or distributed computing platforms, are available for use by a virtual machine 142 hosting the first service. Service orchestration manager 134 can, in some cases, ping one or more servers hosting the external service dependency (e.g., transmit a number of internet control message protocol (ICMP) echo request messages to the one or more servers) and determine whether an external service dependency is available for use based on whether the one or more servers reply to service orchestration manager 134 (e.g., transmit ICMP echo reply messages in response to receiving the ICMP echo request messages from service orchestration manager 134). Information indicating that the ping messages were not received may indicate that the servers hosting the external service dependency are not available; meanwhile, information indicating that the ping messages were successfully received may indicate that the servers hosting the external service dependency are available for use by virtual machine 142 hosting the first service. In some cases, service orchestration manager 134 may attempt to log into a server hosting an external service dependency using credentials (e.g., login tokens, username/password information, and the like) stored at dispatcher virtual machine 130 or included in a configuration file associated with a virtual machine image. If service orchestration manager 134 is able to successfully log into the external service dependency using the credential information, service orchestration manager 134 can determine that the external service dependency is available for use by the virtual machine 142 hosting the first service.

If service orchestration manager 134 determines that an external service dependency is not available, service orchestration manager 134 can transmit a request to an external service provider to instantiate the external service dependency. Upon receiving an indication from the external service provider that the external service dependency is available, service orchestration manager 134 can establish a connection between the virtual machine 142 hosting the first service and the external service dependency.

In one example, to test a live support service for an application, a configuration file for the live support service may indicate that the application and a proxy server to connect the application and the live support service are to be instantiated. The configuration file may indicate that both the application and the proxy server may be deployed as internal services (e.g., on one or more virtual machines 142 executing within virtual machine execution space 140 on dispatcher virtual machine 130). Service orchestration manager 134 can attempt to find a virtual machine 142 hosting the application and a virtual machine hosting a proxy server for connecting the application and the live support service being instantiated. If service orchestration manager 134 finds one or more virtual machines 142 in virtual machine execution space 140 hosting the application and the proxy server, service orchestration manager 134 need not take any further action to deploy the service dependencies for the live support service in virtual machine execution space 140. Otherwise, if service orchestration manager 134 determines that one or both of the application and the proxy server are not deployed within virtual machine execution space, service orchestration manager 134 can obtain the virtual machine images and configuration files for the services that are not deployed and request that virtual machine spawner 132 spawn one or more virtual machines 142 based on the obtained virtual machine images and configuration files, as discussed above.

Error recovery manager 136 generally monitors the operational status of one or more virtual machines 142 executing in virtual machine execution space 140 for system errors and attempts to automatically rectify system errors. Error recovery manager 136 may be configured to perform progressively more intensive error recovery procedures on a virtual machine 142 hosting a service and executing within virtual machine execution space 140 as less severe remediation procedures fail, as discussed in further detail herein.

Error recovery manager 136 may monitor startup operations for a virtual machine 142 to determine whether the virtual machine 142 has been initialized successfully. Error recovery manager 136 may, in some cases, use information identifying when virtual machine spawner 132 begins initializing a virtual machine to set a timer indicating a latest time at which the virtual machine 142 may be expected to respond to status requests transmitted by error recovery manager 136. Error recovery manager 136 may begin transmitting status request messages to virtual machine 142 after a predetermined amount of time has elapsed from the time at which virtual machine spawner 132 begins initializing virtual machine 142. If error recovery manager 136 receives a response from virtual machine 142 before the timer expires, error recovery manager 136 can determine that virtual machine 142 has booted successfully. Otherwise, error recovery manager 136 can determine that the initialization operations for virtual machine 142 have failed and can take one or more actions to attempt to boot the virtual machine 142, as discussed in further detail herein.

In some cases, virtual machine spawner 132 may initialize a virtual machine 142 by using network system booting environments, such as the Preboot Execution Environment (PXE) or the like. Error recovery manager 136 may intercept messages from the network system booting environment to determine whether startup operations for virtual machine 142 have failed. If a network system booting environment returns an error during startup operations for virtual machine 142, error recovery manager 136 can determine that startup operations have failed and can take one or more actions to attempt to boot the virtual machine 142.

If error recovery manager 136 determines that virtual machine 142 has failed during startup operations, error recovery manager can determine that dispatcher virtual machine 130 has not provided one or more components to virtual machine 142 to allow the virtual machine to successfully boot. In some cases, error recovery manager 136 may attempt to recover from the startup error by attempting to start the virtual machine 142 until the virtual machine 142 successfully boots or a threshold number of boot failures has been reached. If virtual machine 142 successfully boots, error recovery manager 136 can begin monitoring virtual machine 142 for runtime errors.

If, however, startup operations for virtual machine 142 fail for the threshold number of times, error recovery manager 136 may perform progressively more intensive error recovery procedures to recover virtual machine 142. For example, error recovery manager 136 may attempt to delete virtual machine 142 from virtual machine execution space 140 and reinstall virtual machine 142 using the virtual machine images and configuration files previously downloaded for the service implemented on the virtual machine 142. In some cases, error recovery manager 136 may request virtual machine spawner 132 to attempt to boot virtual machine 142 determine whether startup operations for virtual machine 142 have succeeded.

If, after reinstalling virtual machine 142, error recovery manager 136 determines that recovery procedures have failed (e.g., that virtual machine 142 failed to successfully boot for the threshold number of times), error recovery manager 136 can delete the virtual machine 142 from user device 120. To delete the virtual machine from user device 120, error recovery manager 136 can access local storage 125 to remove the virtual machine image and configuration files for the virtual machine 142. After error recovery manager 136 deletes the virtual machine image and configuration files for virtual machine 142, error recovery manager 136 can instruct virtual machine spawner 132 to download the virtual machine image and configuration files for the virtual machine 142 from virtual machine image store 152 and configuration file store 154, respectively, from environment repository 150. In some cases, if, after removing and reinstalling virtual machine 142 from a virtual machine image and configuration file downloaded from environment repository 150 and determining that startup procedures for virtual machine 142 have failed, error recovery manager 136 can inform a user of user device 120 that recovery procedures have failed. In some cases, error recovery manager 136 may additionally generate one or more error messages with information identifying the virtual machine 142 and the operating environment in which virtual machine 142 is executing and transmit the error messages to a system administrator.

In some cases, during virtual machine runtime, error recovery manager 136 can monitor the operational status of the virtual machines 142 executing in virtual machine execution space 140 by periodically transmitting status request messages to each virtual machine 142. The status request messages may include, for example, ICMP echo request messages to which a virtual machine 142 responds with an ICMP echo reply, requests for heartbeat information from an application executing within virtual machine 142, and the like. If error recovery manager 136 receives a valid response to a status request message, error recovery manager 136 can determine that the services provided by virtual machine 142 are available for use by other services executing on other virtual machines 142 in virtual machine execution space 140. A valid response may include, for example, an ICMP echo reply received in response to an ICMP echo request transmitted by error recovery manager, a heartbeat value greater than that of a previous heartbeat value reported by a virtual machine 142, and the like.

In some cases, error recovery manager 136 may detect when a user device 120 enters a sleep mode or is otherwise suspended. When error recovery manager 136 determines that user device 120 has exited sleep mode or an otherwise suspended state, error recovery manager 136 can determine whether the virtual machines 142 are alive and accessible to other services executing within virtual machine execution space 140 (e.g., using status response procedures as discussed above). A positive response indicating that a virtual machine 142 is alive and the services executing on virtual machine 142 are active and accessible to other services may prompt error recovery monitor 142 to sleep for a predetermined, configurable amount of time before error recovery monitor 142 determines the operational status of the virtual machines executing in virtual machine execution space 140.

If error recovery manager 136 does not receive a valid response message from a virtual machine 142, error recovery manager 142 can initiate error recovery procedures to restore virtual machine 142 and the services executing on virtual machine 142 to an operational state. In some cases, the error recovery procedures that are performed by error recovery manager 136 may be specified in a configuration file associated with a virtual machine. The error recovery procedures may additionally be defined based on whether an error occurs while a virtual machine 142 is being provisioned by virtual machine spawner 132 or during runtime of virtual machine 142.

During runtime, if error recovery manager 136 determines that a virtual machine 142 is unresponsive, error recovery manager 136 can attempt to restart virtual machine 142. To restart virtual machine 142, error recovery manager 136 can, in some cases, transmit one or more commands to virtual machine 142 simulating termination of power to a computer, which may terminate virtual machine 142 without invoking operating system shutdown procedures which virtual machine 142 may not respond to. After shutting down virtual machine 142, error recovery manager 136 can request that virtual machine spawner 132 boot the virtual machine 142 and monitor for successful startup of the virtual machine 142. If virtual machine 142 successfully boots, error recovery manager 136 can resume monitoring virtual machine 142 for the occurrence of runtime errors.

If error recovery manager 136 determines, however, that restarting virtual machine 142 has failed to recover from an error state (e.g., has failed to generate a responsive virtual machine 142 that other virtual machines 142 in virtual machine execution space 140 can communicate with to generate a testing environment for testing a variety of software services), error recovery manager 136 can attempt to reinstall the virtual machine 142 within virtual machine execution space 140. To do so, error recovery manager 136 may delete a container configured for the virtual machine 142 and create a new container for the virtual machine 142 using the virtual machine image and configuration file previously downloaded for the virtual machine 142. If virtual machine 142 is still unresponsive after reinstalling the virtual machine within virtual machine execution space 140, error recovery manager 136 can remove the virtual machine from user device 120. As discussed above, to remove a virtual machine from user device 120, error recovery manager 136 can access local storage 125 and delete the virtual machine image and configuration file corresponding to the unresponsive virtual machine 142. Error recovery manager 136 may subsequently prompt virtual machine spawner 132 to download the virtual machine image and configuration file corresponding to the service hosted by virtual machine 142 from environment repository 150. Once the virtual machine image and configuration file are downloaded, virtual machine spawner 132 can configure a container within virtual machine execution space 140 based on the configuration file and boot the virtual machine 142 using the downloaded virtual machine image. If virtual machine 142 continues to be unresponsive, error recovery manager can notify a user of user device 120 that virtual machine 142 experienced a runtime error and can additionally notify a system administrator or support technicians that user device 120 encountered an unrecoverable error in virtual machine 142.

Virtual machines 142 spawned by virtual machine spawner 132 generally execute within virtual machine execution space 140, which provides an isolated container in which each virtual machine 142 executes until a virtual machine 142 is terminated (e.g., shut down). The containers provided by virtual machine execution space 140 generally expose, to a virtual machine 142, a virtualized computer including an input/output system, one or more processors, temporary memory, persistent storage, access to networked storage, and so on. When a user selects a virtual machine 142 for termination, virtual machine 130 can shut down the selected virtual machine 142 and terminate the execution space allocated to the selected virtual machine, which frees up resources that can be allocated to a virtual machine execution space for another virtual machine.

Environment repository 150 generally is a repository that stores files that can be used by dispatcher virtual machine 130 to deploy a development environment. As illustrated, environment repository 150 includes virtual machine image store 152 and configuration file store 154.

Virtual machine image store 152 may include versioned copies of virtual machines associated with one or more development environment virtual machines that can be deployed on user machine via dispatcher virtual machine 130. In some cases, virtual machine image store 152 may comprise independent repositories, with each repository being associated with a specific program deployed on a virtual machine. Virtual machine images stored in virtual machine image store 152 may, in some cases, be versioned, with the version information associated with each version of a virtual machine image indicating whether the virtual machine image represents a virtual machine with the latest stable release of a program, a previous release, or a pre-production release of the program that includes features that are under testing.

Configuration file store 154 generally provides a repository that stores configuration files associated with virtual machine images stored in virtual machine image store 152. As discussed, the configuration files stored in configuration file store 154 may indicate, to virtual machine spawner 132, resources to allocate to an execution space in which virtual machine 142 executes. In some cases, the configuration files stored in configuration file store 154 may further indicate the services that programs executing on a virtual machine 142 depend on. As discussed herein, information about the services that a program depends on may be used by service orchestration manager 134 to verify that the specified services are active and, if not, spawn one or more virtual machines to activate the specified services and connect those services to a virtual machine 142 that is executing the program.

Figure 2:
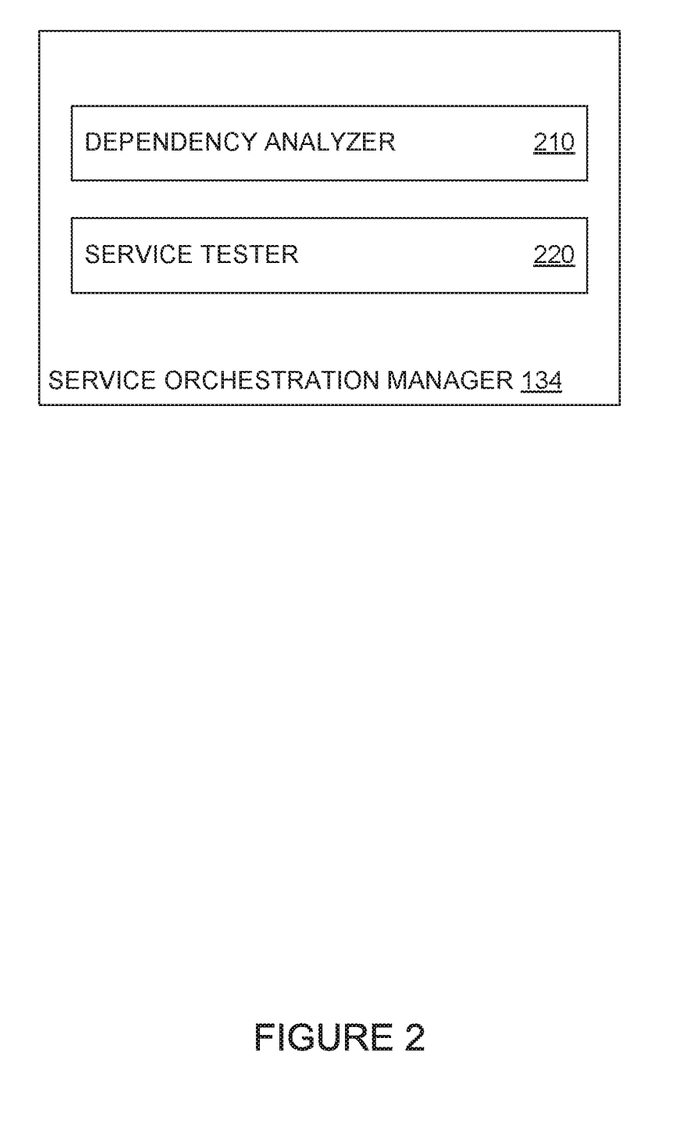
FIG. 2 illustrates an example service orchestration manager, according to one embodiment.

FIG. 2 illustrates an example service orchestration manager 134, according to an embodiment. As illustrated, service orchestration manager 134 generally includes a dependency analyzer 210 and a service tester 220.

Dependency analyzer 210 generally obtains information about the service dependencies of a first service being instantiated on user device 120 and uses the information to invoke service tester 220 and determine whether the service is active. Dependency analyzer 210 may receive, from virtual machine spawner 132, information indicating that a virtual machine 142 is being instantiated and the first service that will be executing on the virtual machine 142. Based on the information about the first service, dependency analyzer 210 can request service dependency information from environment repository 150 (e.g., from configuration file store 154). The service dependency information may be received, for example, as JSON data, an XML file, or another parseable data format.

Dependency analyzer 210 can parse the received service dependency information for the first service to generate a list of the one or more services that the first service requires to operate. Dependency analyzer 210 can pass information about each service dependency to service tester 220 to determine whether a service is active and available for use. If service tester 220 returns information indicating that a service is active and available for use, dependency analyzer 210 can proceed to initiate testing of another service. In some cases, dependency analyzer 210 can further connect the first service to the tested service. If, however, service tester 220 returns information indicating that a service is not available, dependency analyzer 210 can take action to initiate the service. For external services, such as cloud storage services or the like, dependency analyzer can attempt to log into the external service using login information which may be stored at dispatcher virtual machine 130 or retrieved from the service dependency information associated with the first service. For internal services (i.e., services that can execute on one or more virtual machines 142 in virtual machine execution space 140), dependency analyzer 210 can provide information identifying the service to virtual machine spawner 132 and request that virtual machine spawner 132 instantiate one or more virtual machines to execute the identified service.

Service tester 220 generally receives information identifying a service dependency to determine whether the identified service dependency is available for use. The information identifying a service dependency may include, for example, a server hostname, an identity of a service, and so on. In some cases, service tester 220 can ping a machine (e.g., transmit, to an identified machine, an ICMP echo request message) to determine whether the service dependency is available for use. In some cases, service tester 220 can broadcast a status request message to one or more machines (e.g., virtual machines 142 executing in virtual machine execution space 142) to determine whether the service dependency is available for use. If service tester 220 receives a response to a transmitted message (e.g., an ICMP echo request message or a broadcast status request message) from one or more machines, service tester 220 can determine that the identified service is active and can inform dependency analyzer 210 that the service dependency is satisfied. Otherwise, service tester 220 can determine that the identified service is not active and can transmit one or more messages to dependency analyzer 210 to trigger dependency analyzer 210 to initialize the identified service.

Figure 3:
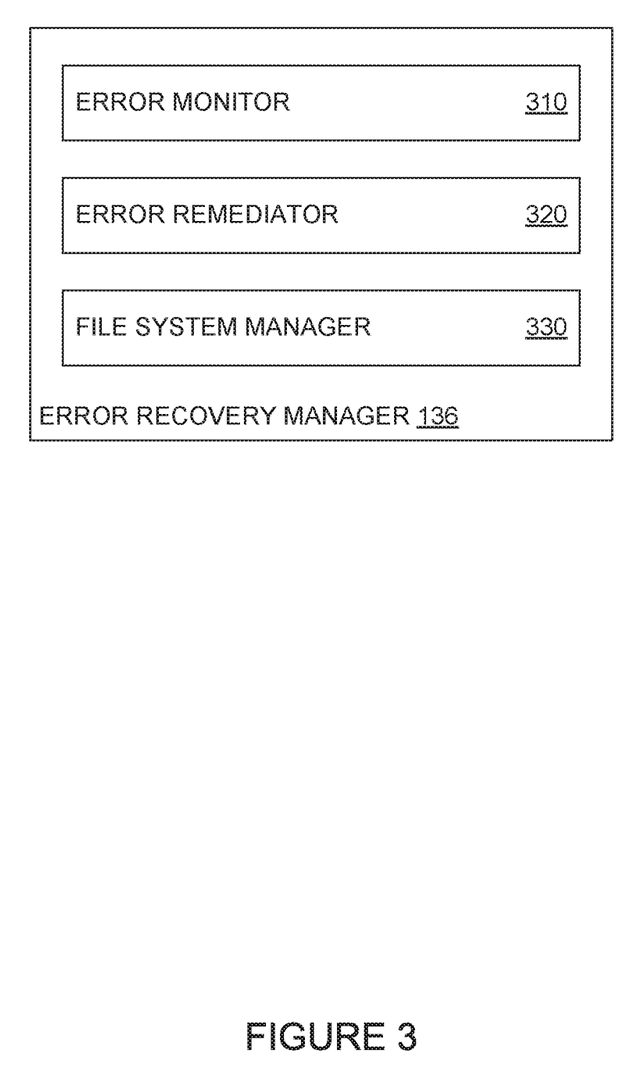
FIG. 3 illustrates an example error recovery manager, according to one embodiment.

FIG. 3 illustrates an example error recovery manager 136, according to an embodiment. As illustrated, error recovery manager 136 generally includes an error monitor 310, an error remediator 320, and a file system manager 330.

Error monitor 310 generally monitors virtual machines 142 during startup and regular operations to determine whether a virtual machine 142 has experienced system errors that may require remediation. Error monitor 310 may receive, from virtual machine spawner 132, an indication of when virtual machine spawner 132 began instantiating virtual machine 142. In response, error monitor 310 may initialize a time to expire after a predetermined amount of time has elapsed from the time at which virtual machine spawner 132 began instantiating the virtual machine 142. Until the timer expires, error monitor 310 can periodically request status information from the virtual machine 142. If error monitor 310 receives a response from the virtual machine 142 indicating that virtual machine 142 has successfully booted up, error monitor 310 may begin periodically monitoring virtual machine 142 for runtime errors. Otherwise, error monitor 310 can determine that virtual machine 142 has failed to successfully boot up and may transfer control to error remediator 320 to take one or more actions to attempt to successfully boot virtual machine 142, as discussed in further detail herein.

Error monitor 310 additionally may periodically monitor the virtual machines 142 executing in virtual machine execution space 140 to identify virtual machines that have encountered runtime failures. To identify these virtual machines, error monitor 310 can periodically transmit status request messages to each virtual machine 142 executing in virtual machine execution space 140. The status request messages may, in some cases, include information identifying the status request messages, such as a sequence number or other unique identifier. The status request messages may be associated with a timeout period within which a virtual machine may be expected to respond to the status request message. If error monitor 310 receives a valid response to the status request message (e.g., a response including the sequence number or other unique identifier), error monitor 310 may determine that virtual machine 142 is operating normally. Otherwise, if error monitor 310 receives an invalid response to the status request message (e.g., a response that cannot be decoded successfully, a response with an incorrect sequence number, and so on) from virtual machine 142, error monitor 310 may determine that the virtual machine 142 has encountered a runtime error and transfer control to error remediator 320 to take one or more actions to attempt to reboot and connect the virtual machine 142, as discussed in further detail herein.

Error remediator 320 generally attempts to restore a virtual machine 142 to an operating state using progressively more intensive recovery procedures in response to recovery failures, as discussed above. Error remediator 320 may, in some cases attempt to reboot the virtual machine 142. To reboot the virtual machine 142, error remediator 320 can transmit one or more commands to virtual machine 142 simulating a hard reboot (e.g., simulating a hardware power-off and power-on procedure). In some cases, if error remediator 320 determines that rebooting the virtual machine 142 has failed for a threshold number of times, error remediator 320 may attempt to reinstall the virtual machine 142 in dispatcher virtual machine 130. After reinstalling the virtual machine 142 in dispatcher virtual machine 130, error remediator 320 can request that virtual machine spawner 132 instantiate the virtual machine 142. If virtual machine 142 still fails to respond after error remediator 320 reinstalls the virtual machine, error remediator 320 can determine that the virtual machine and the files associated with that virtual machine should be removed from user device 120. Error remediator 320 can indicate, to file system manager 330, the one or more files to delete from local storage 125 at user device 120. After receiving an indication that the indicated files have been deleted from local storage 125, error remediator 320 can download the virtual machine image and configuration files associated with virtual machine 142 from virtual machine image store 152 and configuration file store 154, respectively, in environment repository 150. Once error remediator 320 downloads the virtual machine image and configuration file from environment repository 150, error remediator 320 can instruct virtual machine spawner to instantiate virtual machine 142 using the downloaded virtual machine image and configuration file.

Figure 4:
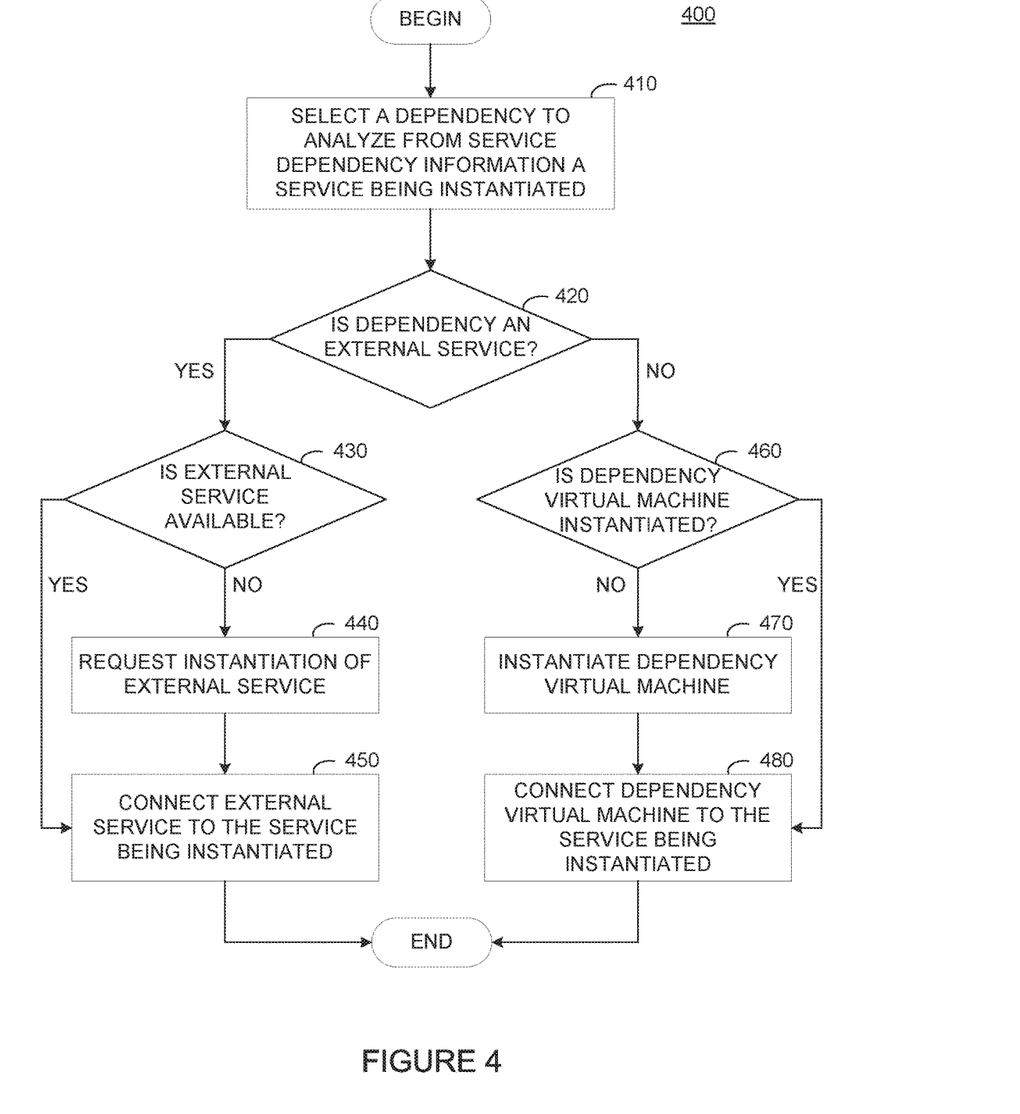
FIG. 4 illustrates example operations for orchestrating instantiation of a service by monitoring for and starting up service dependencies for the service being instantiated, according to one embodiment.

FIG. 4 illustrates example operations that may be performed by a service orchestration manager 134 to manage service dependencies for a service being instantiated, according to an embodiment. As illustrated, operations 400 begin at step 410, where service orchestration manager 134 selects a dependency to analyze from service dependency information for a service being instantiated. As discussed above, service orchestration manager 134 generally obtains service dependency information for a service being instantiated by obtaining configuration information from environment repository 150 identifying the service dependencies for the service being instantiated.

At step 420, service orchestration manager 134 determines whether the service dependency is an external service (e.g., a service not managed within dispatcher virtual machine 130) or an internal service (e.g., a service deployed on a virtual machine 142 within dispatcher virtual machine 130). If the service dependency is an external service, at step 430, service orchestration manager 134 determines whether the external service is available. As discussed above, service orchestration manager 134 can determine whether an external service is available by pinging one or more servers associated with the external service, transmitting status request messages to the one or more servers, attempting to log into the external service, and the like.

If service orchestration manager 134 is unable to connect to the external service, service orchestration manager 134 can determine that the external service is not available, and, at step 440, request instantiation of the external service. At step 450, service orchestration manager 134 can connect the external service to the service being instantiated. Otherwise, if service orchestration manager 134 is able to connect to the external service, operations 400 may proceed from step 430 to step 450, where service orchestration manager 134 connects the external service to the service being instantiated.

If, at step 420, service orchestration manager 134 determines that the dependency is an internal service (e.g., a service hosted on a virtual machine 142 managed by and hosted within dispatcher virtual machine 130), at step 460, service orchestration manager 134 determines whether the virtual machine hosting the service dependency, or the dependency virtual machine, is instantiated. If the dependency virtual machine is not instantiated, at step 470, service orchestration manager 134 can instantiate the dependency virtual machine. As discussed above, to instantiate the dependency virtual machine, service orchestration manager 134 can invoke virtual machine spawner 132 with information identifying the dependency virtual machine, and virtual machine spawner 132 can either boot the dependency virtual machine from a previously downloaded and configured virtual machine image or download a copy of the virtual machine image and configuration file from environment repository 150. After the dependency virtual machine is instantiated, at step 480, service orchestration manager 134 connects the dependency virtual machine to the service being instantiated.

If, however, at step 460, service orchestration manager 134 determines that the dependency virtual machine has already been instantiated, service orchestration manager 134 need not instantiate another instance of the dependency virtual machine. Operations 400 may proceed to step 480, where service orchestration manager 134 connects the dependency virtual machine to the service being instantiated.

Figure 5:
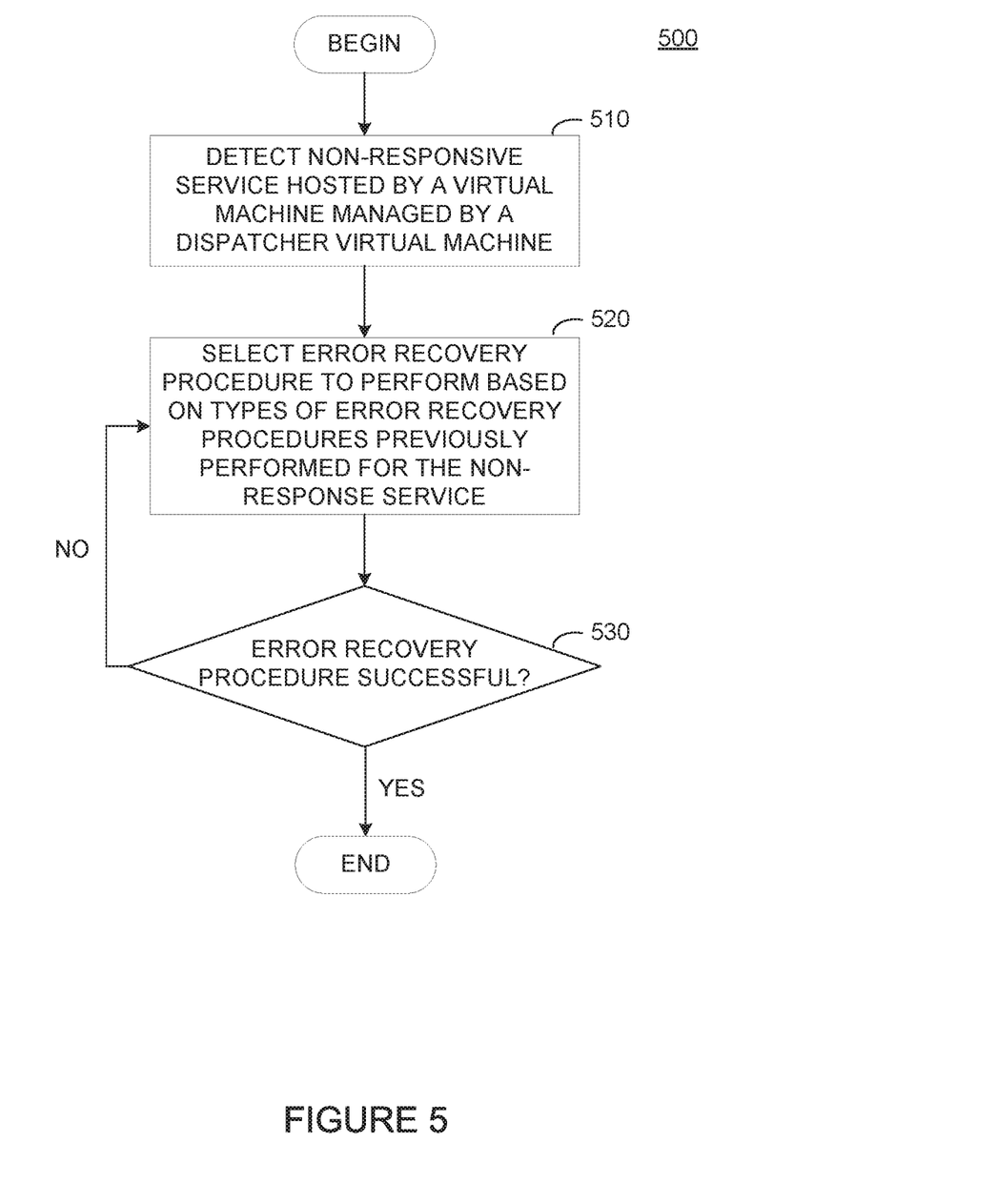
FIG. 5 illustrates example operations for recovering from errors experienced by a service in a managed environment, according to one embodiment.

FIG. 5 illustrates example operations for recovering from errors in a virtual machine by an error recovery manager, according to an embodiment. As illustrated, operations 500 begin at step 510, where error recovery manager 136 detects a nonresponsive service hosted by a virtual machine managed by a dispatcher virtual machine. As discussed above, error recovery manager 136 can detect a nonresponsive service during startup operations for the virtual machine, where the virtual machine if the virtual machine 142 fails to respond to one or more status request messages transmitted from error recovery manager 136 before a timeout period expires. During runtime operations, error recovery manager 136 can detect a service is nonresponsive if the service fails to respond to one or more status request messages or responds to one or more status request messages with invalid data (e.g., a sequence number or unique identifier that does not match a sequence number or unique identifier included in a status request message).

At step 520, error recovery manager 136 selects an error recovery procedure to perform on the virtual machine 142 based on types of error recovery procedures previously performed for the non-responsive service. As discussed above, error recovery manager 136 can begin recovery from a virtual machine error by attempting to reboot the virtual machine 142. If a threshold number of reboot procedures fail to recover the virtual machine 142, error recovery manager 136 can attempt to recover the virtual machine 142 by uninstalling and reinstalling the virtual machine 142 within the operating environment provided by dispatcher virtual machine 130. If the reinstallation process still fails to recover the virtual machine 142, error recovery manager 136 can attempt to recovery the virtual machine 142 by deleting the virtual machine image and configuration data from local storage 125 at user device 120. After deleting the virtual machine image and configuration data from local storage 125, error recovery manager 136 can obtain a new copy of the virtual machine image and configuration data associated with the virtual machine 142 from environment repository 150 and attempt to boot the virtual machine based on the obtained copy of the virtual machine image and configuration data.

At step 530, error recovery manager 136 determines whether the error recovery procedure performed at step 520 was successful. Error recovery manager 136 can determine that an error recovery procedure was successful if, after performing the error recovery procedure, virtual machine 142 begins to respond to status request messages received from error recovery manager 136. If the error recovery procedure is successful, operations 500 may terminate. Otherwise, operations 500 may return to step 520, where, as discussed above, error recovery manager selects another error recovery procedure to perform on the virtual machine 142, where the selected error recovery procedure may be a more intrusive error recovery procedure than those performed previously.

Figure 6:
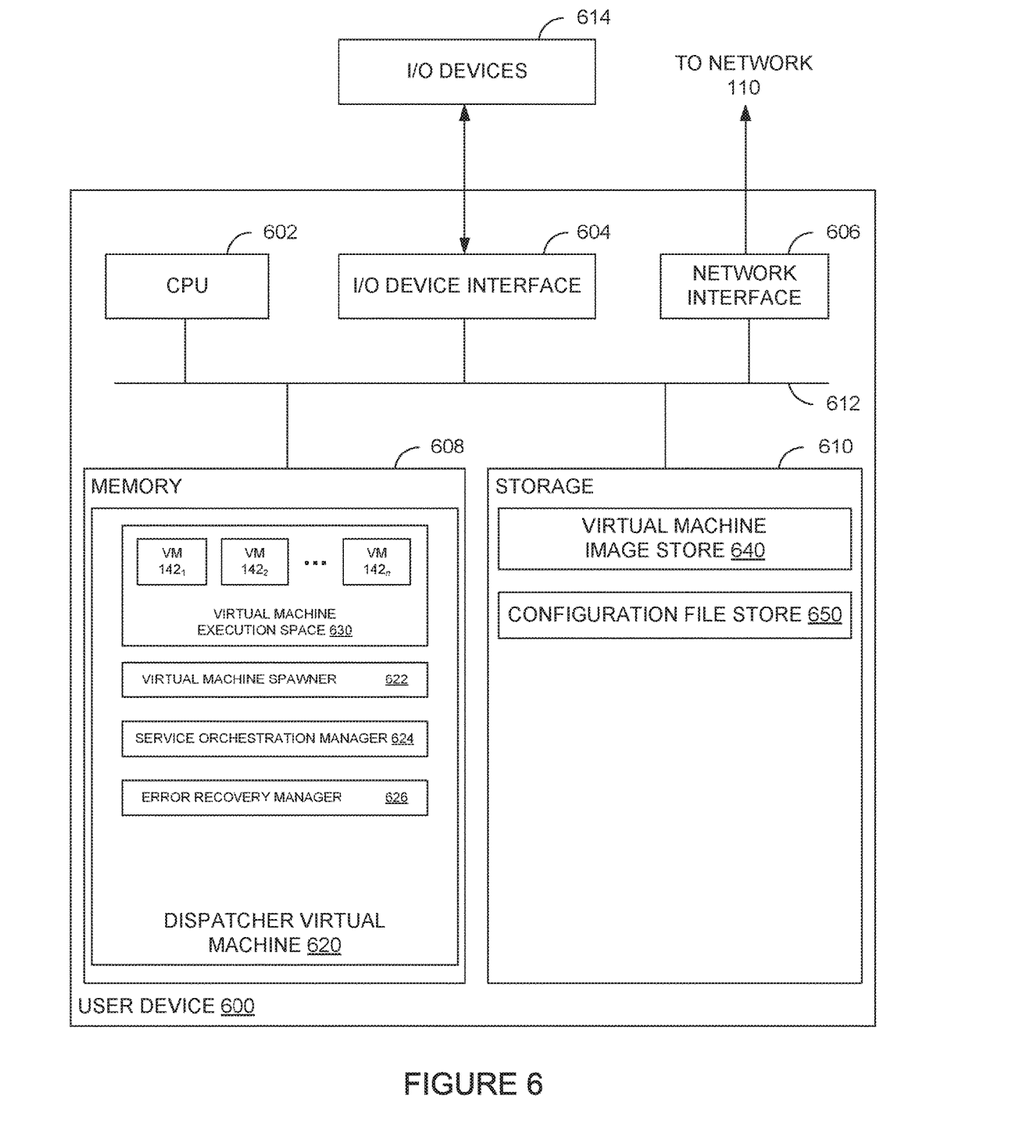
FIG. 6 illustrates an example computing system for managing service dependencies across virtual machines in a development environment, according to one embodiment.

FIG. 6 illustrates a user device 600 that manages service dependences between virtual machines in a development environment and performs silent, automated recovery from errors encountered during operations of virtual machines managed by dispatcher virtual machine 130, according to an embodiment. As shown, the system 600 includes, without limitation, a central processing unit (CPU) 602, one or more I/O device interfaces 604 which may allow for the connection of various I/O devices 614 (e.g., keyboards, displays, mouse devices, pen input, etc.) to the system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes a dispatcher virtual machine 620. Dispatcher virtual machine 620 is generally configured to host a plurality of virtual machines 142 within a virtual machine execution space 630, orchestrate startup of service dependencies when a virtual machine hosting a first service is instantiated, and recover from errors that may result in one or more virtual machines 142 becoming unresponsive.

As illustrated, dispatcher virtual machine 620 generally includes a virtual machine spawner 622, a service orchestration manager 624, an error recovery manager 626, and a virtual machine execution space 630. Virtual machine spawner 622 can receive information identifying a virtual machine to be instantiated (e.g., via user inputs from a user interface exposed to a user by dispatcher virtual machine 620 or inputs provided to virtual machine spawner 622 from service orchestration manager 624 and/or error recovery manager 626). Based on the information identifying a virtual machine to be instantiated, virtual machine spawner 622 can obtain a local copy of a virtual machine image and configuration file (e.g., by copying the virtual machine image and configuration file from virtual machine image store 640 and configuration file store 650, respectively, or by downloading the virtual machine image and configuration file from a remote environment repository 150). After obtaining the virtual machine image and configuration file for a virtual machine, virtual machine spawner 622 instantiates virtual machine 142 in virtual machine execution space 630 based on the obtained virtual machine image and configuration file. The configuration file generally specifies a configuration for the virtual machine 142, which may include, for example, a number of virtual processors to allocate to virtual machine 142, an amount of random access memory (RAM) to allocate to virtual machine 142, a location of a virtual machine image from which virtual machine 142 executes, one or more files serving as a virtualized local storage for virtual machine 142, and the like. Based on the configuration file, virtual machine spawner 622 can instantiate a virtual machine container within virtual machine execution space 630 in which virtual machine 142 executes.

Service orchestration manager 624 generally receives information identifying a virtual machine 142 being instantiated by virtual machine spawner 622 and determines whether the service dependencies that virtual machine 142 uses are available for use within virtual machine execution space 630 and/or whether virtual machines 142 should be instantiated to execute one or more service dependencies. As discussed above, service orchestration manager 624 can obtain information identifying the service dependencies of the service being instantiated by virtual machine spawner 622. For each identified service dependency, service orchestration manager 624 can request status information from the one or more virtual machines 142 executing in virtual machine execution space 630. If one or more virtual machines 142 respond to the status information request, service orchestration manager 624 can determine that the service dependency is active and can connect the virtual machine 142 hosting the service dependency to the virtual machine being instantiated.

Otherwise, if service orchestration manager 624 does not receive a response to the status information requests broadcast to the one or more virtual machines 142 in virtual machine execution space 630, service orchestration manager 624 can determine that the service dependency is not executing in virtual machine execution space 630. In response, service orchestration manager can transmit information identifying the service dependency and request that virtual machine spawner 622 instantiate one or more virtual machines from virtual machine images associated with the identified service dependency. When the virtual machine for the identified service dependency is instantiated, service orchestration manager 624 can connect the virtual machine hosting the service dependency to the virtual machine being instantiated.

Error recovery manager 626 generally monitors the one or more virtual machines 142 for errors in booting the virtual machines and runtime errors. Upon detecting an error, such as a failure to successfully boot a virtual machine or discontinuation of communications with a virtual machine, error recovery manager 626 may iterate through progressively more intensive recovery procedures to attempt to recover the virtual machine 142.

To monitor the one or more virtual machines 142 for errors, error recovery manager 626 may transmit one or more status request messages to each virtual machine. The status request messages may, in some cases, include a sequence number or other unique identifier that virtual machine 142 may return in a valid response. If a virtual machine 142 responds to the status request with a valid response, error recovery manager 626 can determine that the virtual machine 142 has not encountered a critical error that prevents virtual machine 142 from booting or, if already booted, responding to requests from other virtual machines executing in virtual machine execution space 630.

Otherwise, as discussed above, error recovery manager 626 may attempt to reboot the virtual machine 142 to remedy the errors. In some cases, error recovery manager 626 may perform up to a threshold number of hard reboot operations (e.g., simulating a power-off/power-on cycle without using shutdown procedures provided by an operating system executing on virtual machine 142). If the threshold number of hard reboot operations fail, error recovery manager may remove and reinstall the virtual machine 142 in dispatcher virtual machine 620 using the virtual machine image and configuration file previously downloaded for the virtual machine 142. If error recovery manager 626 determines that the virtual machine 142 is still unresponsive after reinstallation, error recovery manager 626 may delete the virtual machine image and configuration file from a virtual machine directory in storage 610 and download a new copy of the virtual machine image and configuration file (e.g., from virtual machine image store 640 and configuration file store 650, or from an environment data store accessible by user device 600 using a network connection). After downloading the new copy of the virtual machine image and configuration file, error recovery manager 626 can request virtual machine spawner 622 to generate a new virtual machine 142 in virtual machine execution space 630 based on the newly downloaded virtual machine image and configuration file. If virtual machine 142 continues to be unresponsive, error recovery manager 626 can generate an alert to display to a user of user device 600 identifying the virtual machine and service hosted thereon that are unresponsive, and, in some cases, automatically generate a message to technical support staff with information about the unrecoverable error for the virtual machine and service hosted thereon.

As shown, storage 610 includes a virtual machine image store 640 and a configuration file store 650. Virtual machine image store 640 generally stores versioned copies of virtual machines associated with one or more development environment virtual machines that can be deployed on user machine via dispatcher virtual machine 620. As discussed above, virtual machine image store 640 may include a plurality of independent repositories, with each repository being associated with a specific program deployed on a virtual machine. Virtual machine images stored in virtual machine image store 640 may, in some cases, be versioned, with the version information associated with each version of a virtual machine image indicating whether the virtual machine image represents a virtual machine with the latest stable release of a program, a previous release, or a pre-production release of the program that includes features that are under testing.

Configuration file store 650 generally stores configuration files associated with virtual machine images stored in virtual machine image store 640. The configuration files stored in configuration file store 650 may indicate the resources that dispatcher virtual machine 620 is to allocate to an execution space in which virtual machine 142 executes. In some cases, the configuration files stored in configuration file store 650 may further indicate the services that programs or services executing on a virtual machine 142 depend on. The dependency information included in a configuration file may be used by service orchestration manager 624 to verify that the specified services are active and, if not, spawn one or more virtual machines to activate the specified services and connect those services to a virtual machine 142 that is executing the program.

Advantageously, by orchestrating the availability of service dependencies in a development environment, a user can rapidly generate a development environment for use in building new functionality for a service or debugging existing functionality of the service. Automatic orchestration of service dependencies in a virtual machine-based development environment may also allow software developers to generate a development environment without having to know what services a complex software system depend on or requesting technical support to generate a development environment using multiple, interconnected services.

Further, by automatically recovering from system errors in a virtual machine-based development environment, a virtual machine-based development environment may be self-healing. A user need not manually remediate errors in the virtual machine-based development environment and may be able to continue to develop software in the development environment while error remediation procedures are performed in the background.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for error recovery in a virtual machine-based development environment, comprising:
    monitoring for an error event in a first virtual machine managed by a second virtual machine hosting the virtual machine-based development environment including at least the first virtual machine;
    attempting, by a recovery agent executing on the second virtual machine, to recover the first virtual machine from the error event by performing a first error remediation procedure on the first virtual machine; and
    upon determining that the first error remediation procedure failed to recover the first virtual machine from the error event, attempting, by the recovery agent, to recover the first virtual machine from the error event by performing a second error remediation procedure on the first virtual machine, wherein the second error remediation procedure is more severe than the first error remediation procedure.

2. The method of claim 1, wherein the first error remediation procedure and the second error remediation procedure are defined in an error remediation script for the first virtual machine.

3. The method of claim 1, further comprising: upon determining that the second error remediation procedure failed to recover the first virtual machine from the error event and that no further error remediation procedures can be performed on the first virtual machine, informing a user of the virtual machine-based development environment that the first virtual machine has encountered an unrecoverable error.

4. The method of claim 1, wherein the first error remediation procedure comprises rebooting the first virtual machine, and the second error remediation procedure comprises reinstalling the first virtual machine in the virtual machine-based development environment.

5. The method of claim 4, wherein determining that the first error remediation procedure failed to recover the first virtual machine from the error event comprises determining that a threshold number of reboot attempts have failed to recover the first virtual machine from the error event.

6. The method of claim 4, further comprising:
    upon determining that the second error remediation procedure failed to recover the first virtual machine from the error event, performing a third error remediation procedure on the first virtual machine, wherein the third error remediation procedure comprises:
        deleting a virtual machine image and a configuration file associated with the first virtual machine from a local file system of a computer on which the virtual machine-based development environment executes;
        downloading, from a virtual machine repository, a copy of the virtual machine image and a copy of the configuration file associated with the first virtual machine; and
        instantiating the first virtual machine based on the copy of the virtual machine image and the copy of the configuration file.

7. The method of claim 1, wherein monitoring for an error comprises:
    during startup operations on the first virtual machine, setting a timer to expire when a threshold amount of time has passed after startup operations begin on the first virtual machine; and
    until the timer expires or a valid response is received from the first virtual machine, periodically transmitting a status request message to the first virtual machine.

8. The method of claim 1, wherein monitoring for an error comprises periodically transmitting a status request message to the first virtual machine and waiting for a response to the status request message from the first virtual machine.

9. The method of claim 8, wherein the status request message includes a unique identifier, and wherein monitoring for an error comprises comparing the unique identifier included in the status request message to a unique identifier included in the response from the first virtual machine.

10. The method of claim 8, wherein monitoring for an error comprises determining that the first virtual machine is in an error state if the response is not received within a threshold amount of time.

11. A system, comprising:
    a processor; and
    a memory storing instructions which, when executed by the processor, performs an operation for error recovery in a virtual machine-based development environment, the operation comprising:
        monitoring for an error event in a first virtual machine managed by a second virtual machine hosting the virtual machine-based development environment including at least the first virtual machine;
        attempting, by a recovery agent executing on the second virtual machine, to recover the first virtual machine from the error event by performing a first error remediation procedure on the first virtual machine; and upon determining that the first error remediation procedure failed to recover the first virtual machine from the error event, attempting, by the recovery agent, to recover the first virtual machine from the error event by performing a second error remediation procedure on the first virtual machine, wherein the second error remediation procedure is more severe than the first error remediation procedure.

12. The system of claim 11, wherein the first error remediation procedure and the second error remediation procedure are defined in an error remediation script for the first virtual machine.

13. The system of claim 11, wherein the operation further comprises: upon determining that the second error remediation procedure failed to recover the first virtual machine from the error event and that no further error remediation procedures can be performed on the first virtual machine, informing a user of the virtual machine-based development environment that the first virtual machine has encountered an unrecoverable error.

14. The system of claim 11, wherein the first error remediation procedure comprises rebooting the first virtual machine, and the second error remediation procedure comprises reinstalling the first virtual machine in the virtual machine-based development environment.

15. The system of claim 14, wherein determining that the first error remediation procedure failed to recover the first virtual machine from the error event comprises determining that a threshold number of reboot attempts have failed to recover the first virtual machine from the error event.

16. The system of claim 14, wherein the operations further comprises:
  upon determining that the second error remediation procedure failed to recover the first virtual machine from the error event, performing a third error remediation procedure on the first virtual machine, wherein the third error remediation procedure comprises:
    deleting a virtual machine image and a configuration file associated with the first first virtual machine from a local file system of a computer on which the virtual machine-based development environment executes;
    downloading, from a virtual machine repository, a copy of the virtual machine image and a copy of the configuration file associated with the first virtual machine; and
    instantiating the first virtual machine based on the copy of the virtual machine image and the copy of the configuration file.

17. A non-transitory computer-readable medium comprising instructions which, when executed by one or more processors, performs an operation for error recovery in a virtual machine-based development environment, the operation comprising:
  monitoring for an error event in a first virtual machine managed by a second virtual machine hosting the virtual machine-based development environment including at least the first virtual machine;
  attempting, by a recovery agent executing on the second virtual machine, to recover the first virtual machine from the error event by performing a first error remediation procedure on the first virtual machine; and
  upon determining that the first error remediation procedure failed to recover the first virtual machine from the error event, attempting to recover the first virtual machine from the error event by performing a second error remediation procedure on the first virtual machine, wherein the second error remediation procedure is more severe than the first error remediation procedure.

18. The non-transitory computer-readable medium of claim 17, wherein the operations further comprises: upon determining that the second error remediation procedure failed to recover the first virtual machine from the error event and that no further error remediation procedures can be performed on the first virtual machine, informing a user of the virtual machine-based development environment that the first virtual machine has encountered an unrecoverable error.

19. The non-transitory computer-readable medium of claim 17, wherein the first error remediation procedure comprises rebooting the first virtual machine, and the second error remediation procedure comprises reinstalling the first virtual machine in the virtual machine-based development environment.

20. The non-transitory computer-readable medium of claim 19, wherein the operation further comprises:
  upon determining that the second error remediation procedure failed to recover the first virtual machine from the error event, performing a third error remediation procedure on the first virtual machine, wherein the third error remediation procedure comprises:
    deleting a virtual machine image and a configuration file associated with the first virtual machine from a local file system of a computer on which the virtual machine-based development environment executes;
    downloading, from a virtual machine repository, a copy of the virtual machine image and a copy of the configuration file associated with the first virtual machine; and
    instantiating the first virtual machine based on the copy of the virtual machine image and the copy of the configuration file.

* * * * *